Patented Aug. 13, 1946

2,405,816

UNITED STATES PATENT OFFICE 2,405,816

O:O'-DIHYDROXY AZO DYESTUFFS AND A PROCESS FOR THEIR MANUFACTURE

Achille Conzetti, Basel, Switzerland, assignor to J. R. Geigy A. G., Basel, Switzerland, a Swiss company No Drawing. Application September 21, 1942, Serial No. 459,172. In Switzerland November 4, 1941

4 Claims. (Cl. 260—163)

It has been found that dyestuffs of very good dyeing properties are obtained by coupling diazotised 6-nitro-2-amino-4-alkylphenols, the alkyl group of which contains at least 3 C-atoms, with azo components containing at least one water-solubilizing group and having an OH-group in the 2-position to the coupling place. With regard to known dyestuffs possessing, instead of the above mentioned alkyl groups, alkyl groups with less than 3 C-atoms the new dyestuffs are improved with respect to the fastness properties. They are distinguished in the most cases especially by an improved light-fastness. Moreover, they possess improved wetting properties and are by far more suitable for the one-bath chroming process. According to the azo component used they dye wool, when after-chromed, with purer shades than the known comparable products.

The production of the claimed alkyl phenols is carried out according to known methods by nuclear alkylation of a phenol with the corresponding alcohol or by conversion of an acylated phenol into a C-acyl phenol and reduction of the latter.

While the diazotisation takes place in the normal manner it is advantageous, but not absolutely necessary, to add an auxiliary agent, such as for example pyridine, during the coupling.

The present invention is illustrated, but not limited by the following examples, the parts being by weight, unless otherwise stated.

Example 1

22.4 parts of 6-nitro-2-amino-4-amylphenol of 100% strength are introduced in form of the chlorhydrate into 160 parts of water and, after addition of 14 parts by volume of concentrated hydrochloric acid, diazotised at 0°–5° C. by means of 6.9 parts of nitrite.

The yellow diazo suspension is allowed to run at 0° C. into a solution of 29.06 parts of 1-(4'-sulfo)-phenyl-3-methyl-5-pyrazolone in 150 parts of water and 20 parts of calcinated sodium carbonate. On the next morning, the whole mixture is filtered. The after-chromed wool dyeing, a clear yellowish red, shows better fastness properties to light and potting and purer shades than the dyeings obtained with the dyestuff from 6-nitro-2-amino-4-methylphenol and the same azo component. Moreover, the new dyestuff shows a better drawing power according to the one-bath chroming process.

If, instead of the above azo component, there are used 1-(3'-sulfo)- or 1-(2'-sulfo)-phenyl-3-methyl-5-pyrazolone and their methyl or halogen substitution products, dyestuffs of similar properties are obtained.

Example 2

22.4 parts of 6-nitro-2-amino-4-amylphenol are diazotised as indicated in Example 1. The diazo suspension is caused to flow into a solution of 22.5 parts of 2-hydroxy-naphthalene-4-sulfonic acid made weakly alkaline to litmus, to which solution there has still been added 15 parts of calcinated sodium carbonate and 20 parts of technical pyridine. On the following day, the mixture is salted out by means of 60 parts of sodium chloride, filtered and dried.

The new dyestuff dyes, when after-chromed, with reddish blue shades. Also in this case some properties are improved when compared with the dyestuff from the 4-methyl derivative, but especially to a great extent the drawing power according to the one-bath chroming process is highly improved.

Example 3

22.4 parts of 6-nitro-2-amino-4-amylphenol are diazotised as stated in Example 1. The diazo suspension is caused to flow into an ice-cold solution of 31.2 parts of 2-carbomethoxy-amino-6-hydroxy-naphthalene-8-sulfonic acid which has been dissolved in 200 parts of water, made alkaline to litmus by means of sodium carbonate and then treated with 20 parts of calcinated sodium carbonate.

On the next morning, the dyestuff is filtered. It dyes, when after-chromed on wool, with grey shades of a high light-fastness. According to the one-bath chroming process the new dyestuff draws much better than the dyestuff from 6-nitro-2-amino-4-methyl phenol; the dyeings thus obtained are faster to potting.

Example 4

21 parts of 6-nitro-4-butyl-2-aminophenol are dissolved in 200 parts of alcohol, then 30 parts of concentrated hydrochloric acid are added thereto and the whole is diazotised at 0° C. with a solution of 6.9 parts of sodium nitrite in 10 parts of water. The diazo solution is then caused to flow into a solution of 25.4 parts of p-sulfophenyl methyl pyrazolone in 300 parts of water and 22 parts of sodium carbonate as acid binding agent. The dyestuff precipitates out in a crystalline form. After completion of the coupling it is filtered off and dried.

*Example 5*

26.6 parts of 6-nitro-4-diisobutyl-2-aminophenol are dissolved in 400 parts of alcohol, then treated with 30 parts of concentrated hydrochloric acid and diazotised at 0° C. with a solution of 6.9 parts of sodium nitrite in 10 parts of water. The diazo solution is caused to flow into an ammoniacal solution of 22.4 parts of 2-naphthol-4-sulfonic acid in 200 parts of water, to which solution 10 parts of pyridine has been added. When the coupling is completed, the alcohol is evaporated, the dyestuff salted out with sodium chloride, filtered off and dried.

*Example 6*

19.6 parts of 6-nitro-4-isopropyl-2-aminophenol are dissolved in 200 parts of alcohol, then 30 parts of concentrated hydrochloric acid are added thereto and the solution is diazotised with a solution of 6.9 parts of sodium nitrite in 10 parts of water. A neutral solution of 32 parts of chromotropic acid in 1000 parts of water is then caused to flow into this solution. As acid binding agent lime milk is added. After completion of the coupling the whole is heated up to 80° C. and the excess slaked lime is filtered off. The dyestuff is now salted out by means of sodium chloride, filtered off and dried.

In the following table still some further dyestuffs are enumerated which are obtained with a diazotised 6-nitro-2-amino-alkylphenol.

azotised 6-nitro-2-amino-4-amylphenol with a pyrazolone sulfonic acid.

2. Process for the manufacture of o:o'-dihydroxy azo dyestuffs which comprises coupling diazotised 6-nitro-2-amino-4-amylphenol with 1-(4'-sulfo)-phenyl-3-methyl-5-pyrazolone.

3. Dyestuffs of the formula

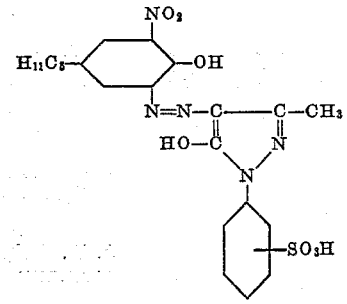

possessing valuable properties, being very suitable for the one-bath chroming process and showing, when after chromed, excellent fastness properties to light.

4. The dyestuff of the formula

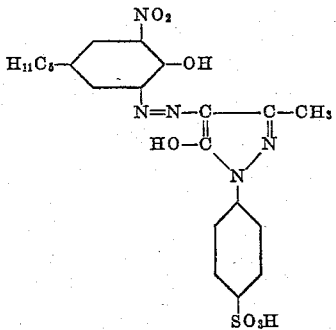

dyeing wool according to the one-bath chroming process with very pure red shades of very good fastness to light and potting.

| Diazo component | Azo component | Color of the— | |
|---|---|---|---|
| | | Acid dyeing | After-chromed dyeing |
| 6-nitro-2-amino-4-amylphenol | 1:8-dihydroxynaphthalene-3:6-disulfonic acid | Violet-blue | Blue. |
| Do | 1-(3'-carboxyphenyl)-5-pyrazolone-3-carboxylic acid | Brown | Clear yellowish red. |
| 6-nitro-2-amino-4-amylphenol | 1-hydroxynaphthalene-4-sulfonic acid | Dull violet | Pure reddish violet. |
| Do | 1-phenylamino-8-hydroxynaphthalene-4-sulfonic acid | Dull violet-grey | Pure bluish green. |
| Do | 1-benzoylamino-8-hydroxynaphthalene-4-sulfonic acid | Red-violet | Bluish-grey. |
| 6-nitro-2-amino-4-butylphenol | 2-naphthol-4-sulfonic acid | Violet | Grey-blue. |
| 6-nitro-2-amino-4-isooctylphenol | p-Sulfophenylmethylpyrazolone | Orange | Red. |

What I claim is:

1. Process for the manufacture of o:o'-dihydroxy azo dyestuffs which comprises coupling di-

ACHILLE CONZETTI.